Nov. 15, 1955  R. RUPERT  2,723,595
REFLECTING DEVICE
Filed Dec. 26, 1951
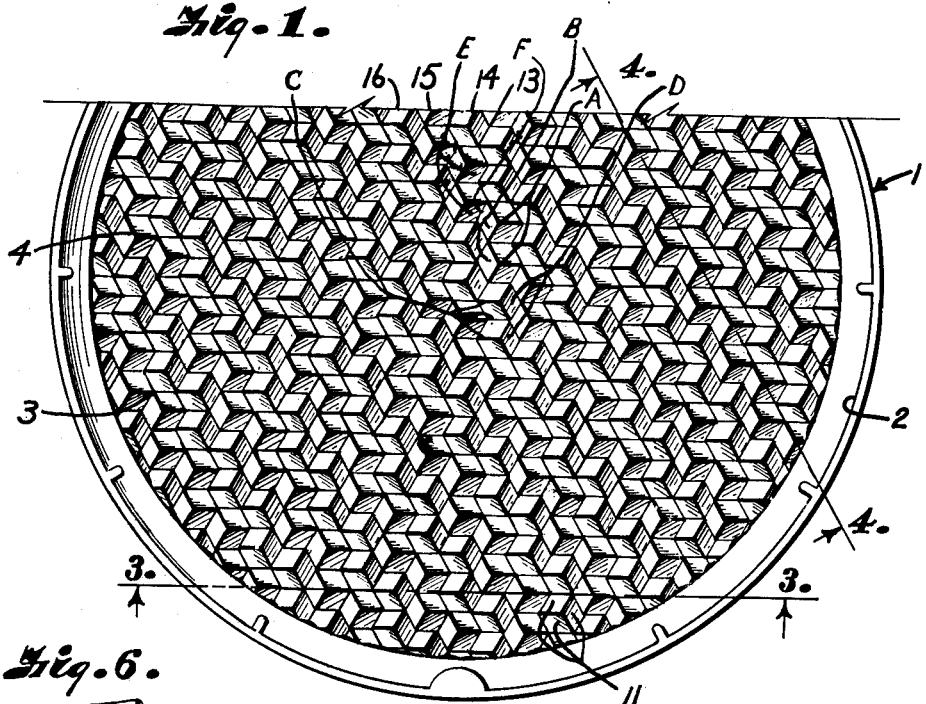
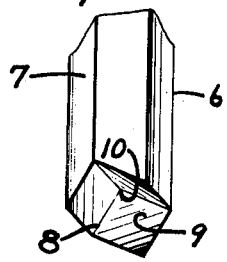
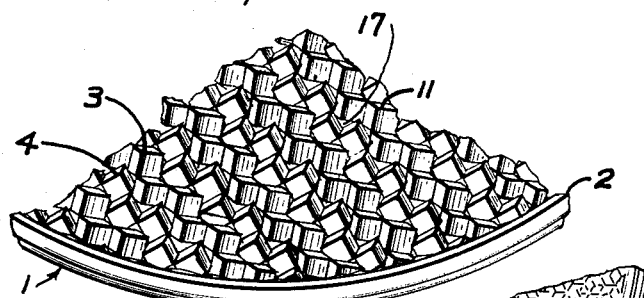
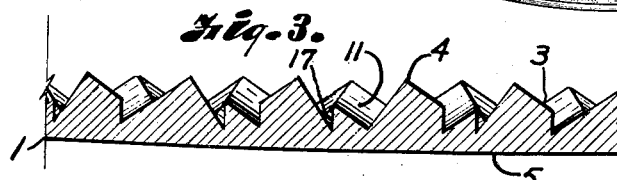
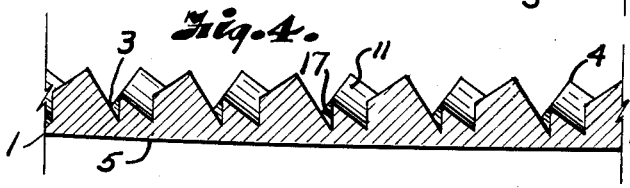
INVENTOR.
Richard Rupert.
BY
Fishburn + Mullendore
ATTORNEYS.

United States Patent Office 2,723,595
Patented Nov. 15, 1955

2,723,595

REFLECTING DEVICE

Richard Rupert, Independence, Mo.

Application December 26, 1951, Serial No. 263,340

1 Claim. (Cl. 88—78)

This invention relates to reflecting devices and more particularly to solid transparent reflectors which are constructed to reflect light impinging thereon from a distant source back to the general direction of the light source irrespective, within limits, of the angle of incidence of the impinging light.

Solid transparent reflecting devices having a series of reflecting units with reflecting surfaces arranged relatively at approximate right angles and in a circuit about the axis thereof have long been used as signals on automobiles and at points of danger to reflect the beam of an automobile headlight to apprise drivers that they are approaching a danger point or other location. The reflecting units of such devices have three reflecting surfaces on the rear faces arranged to intersect at a common point with the reflecting surfaces at right angles to each other, such as, in effect, the corner of a cube, whereby the beam of light originating in front of the reflecting device and directed toward the front face thereof impinges on such a reflecting surface and is reflected from surface to surface about the axis and back along the instant beam. The reflecting units preferably are prismatic and have highly polished surfaces in proper angular relation to form substantially optically true, congruent, trihedral angles. It is also common practice for such reflecting devices to have spherical front faces. In reflecting devices of such character the units have different ranges of inclination with respect to the axis of the unit. Due to this characteristic the angular range or field is greater on one side of the axis of the unit than on the other. Under some conditions this restricts the utility of the device.

In some such devices the reflecting units have been arranged in areas on opposite sides of a bisecting division line with corresponding surfaces of the units in each area lying in parallel planes whereby the units in one area have opposed orientations to the units in the other area, the corresponding reflecting surfaces of the units in each area which are parallel to the division line therebetween facing generally away from said division line. Such an arrangement gives substantially the same range of inclination on both sides of a division line but there is a loss of reflecting ability in the line of division or juncture of the areas, and the entire reflecting device is not of uniform efficiency when viewed at different angles relative to the direction of the division line, making it important to position the division line substantially perpendicular to the plane in which light beams are usually directed on the device. In such reflecting devices, when light is directed from one side and at an angle to the device, the reflecting surfaces of the prismatic formations in one area or one-half of the reflecting device is effective in reflecting light back to the source, and when light is directed on the reflecting device from the other side and at an angle to the reflecting device, the reflecting surfaces of the prismatic formations in the other area or half of the reflecting device are effective in reflecting light back to the source.

In solid transparent reflecting devices having three reflecting surfaces arranged to form substantially congruent, trihedral angles, and wherein a series of reflecting units is arranged in contiguous relation with each of the units having reflecting surfaces arranged relatively at approximate right angles and in a circuit about the axis thereof, the prismatic formations must be related or arranged in rows with corresponding surfaces parallel. It has been found that with such an arrangement of prismatic formations there are definite limitations as to the reflecting ability when the light is directed thereon from some angles, there being substantially no reflection from all or certain areas of the reflecting device.

The objects of the present invention are to provide a solid transparent reflecting device in which these disadvantages are substantially overcome; to provide a solid transparent reflecting device having an arrangement of prismatic formations with reflecting surfaces whereby the effective reflecting surfaces will be substantially uniformly distributed over the entire reflector; to provide a reflecting device having prismatic reflecting units with surfaces intersecting to form merging hexagonal apertures and arranged for uniform reflection from the full face of the reflecting device when light is directed thereon from any angle within limits of any reflection; and to provide a reflecting device with prismatic formations having reflecting surfaces in pairs in a row wherein the reflecting surfaces of one pair of units in said row face generally opposite to certain reflecting surfaces of the next pair of units in said row with the pairs of reflecting units in the next adjacent row being staggered and facing oppositely to the reflecting units in the first row.

In accomplishing these and other objects of the present invention, I have provided improved details of structure, the preferred forms of which are illustrated in the accompanying drawings, wherein:

Fig. 1 is a detail rear view of a portion of the solid transparent reflecting device.

Fig. 2 is a perspective view of a plurality of reflecting units from the rear of the reflecting device.

Fig. 3 is a transverse sectional view through a portion of the reflecting device on the line 3—3, Fig. 1.

Fig. 4 is an enlarged sectional view through a portion of the reflecting device on the line 4—4, Fig. 1.

Fig. 5 is a front view of a portion of the reflecting device illustrating the hexagonal apertures thereof.

Fig. 6 is an enlarged perspective view of a pin of a mold for forming one prismatic unit of the reflecting device.

Referring more in detail to the drawings:

1 designates a solid transparent reflecting device illustrated in the form of a circular disk, although it will be understood that the device may be of any other suitable formation. The reflecting device may be provided with a rim 2 so as to fit a suitable holder (not shown) for mounting the device on a vehicle or other desired location. The reflector in this particular embodiment has a rear face of prismatic formation 3 in the form of a pressed or molded article made of glass or artificial resin. The reflecting device has on the back thereof a series of prismatic reflecting units 4 of the central triple reflector type. The front face 5 of the reflecting device may be plane, convex or concave, and the reflecting units conform generally to the contour of the front face with the axes of the reflecting units parallel. Generally the reflector units 4 are each of the character in which a series of reflecting surfaces is arranged relatively at approximate right angles and in a circuit around the reflector unit axis, so that light entering the front face and from a distant source will impinge on the reflecting surfaces and will be successively reflected by said surfaces about the axis and back in the general direction of the light source.

The units are arranged whereby perimeters thereof as defined by the outer extremities of the surfaces of each unit form in effect an hexagonal aperture or area through which light, originating in front of the unit and directed toward the front face, passes to the reflecting surfaces.

In the construction of a molded reflecting device, the prismatic formation 3 is a duplicate in reverse of the mold, and in whatever manner the mold is formed, the reflector will correspond. It is preferable that the mold be formed of a plurality of hexagonal pins 6 with each of the side faces 7 thereof contacting a side face of one of the surrounding pins. Each of said pins is preferably provided with a female recess 8 having three surfaces 9 arranged to intersect at a common point 10 with the surfaces 9 at right angles to each other to form congruent, trihedral angles. The surfaces 9 are preferably of square shape. The female recess 8 in each pin forms a prismatic reflector unit 4. It is preferable that each surface 11 of the reflector units 4 be approximately optically flat and highly polished and that the line of intersection between adjacent surfaces throughout the entire prismatic formation be very sharp whereby substantially the entire prismatic area is a plurality of reflecting surfaces whereby light entering the reflecting device from the front face 5 is reflected back generally toward the light source with substantially no loss of reflecting ability due to lines of intersection.

The prismatic structure is such that it is defined by a plurality of contiguous, hexagonal areas or apertures 12, each of which is formed by a single pin 6 of the mold. The perimeter of each reflecting unit 4 defines an hexagonal aperture 12 for light entering said unit from the front face 5. The reflecting units and hexagonal areas, therefore, are arranged in parallel rows shown as extending vertically in Fig. 1 with a pair of adjacent reflecting units, for example pair A in row 13, arranged with corresponding surfaces of said units lying in parallel planes, each of the reflecting units of said pair having the same orientation with one set of corresponding surfaces B parallel to the row of reflecting units. The reflecting units of a pair have the same orientation, as their corresponding reflecting surfaces are turned in the same direction. The maximum range of inclination of said units having the same orientation lie towards the corresponding surfaces, for example toward the surfaces parallel to the row of reflecting units with the minimum range of inclination on the other side of the axis. The next adjacent pair C of reflecting units in the row 13 has opposed orientations to the first pair. In other words, corresponding surfaces D of the pair C which are parallel to the row face in the opposite direction to the surfaces B of the pair A. The reflecting units are arranged in pairs in a row with alternate pairs of units having the same orientation and adjacent pairs in a row having opposed orientation so one pair of reflecting units will reflect strongly when a beam of light is directed toward the front face from one side of the axes and an adjacent pair will reflect strongly when the beam of light is directed toward the front face from the other or opposite side of the axes. The next adjacent row 14 of reflecting units has the same relative relationship as to the pairs of units in said row as the reflecting units in the first described row 13; however, the reflecting units of said next adjacent row 14 are offset from the units of the row 13 a distance equal to one-half the spacing between the sides or flats of the hexagonal apertures with the pairs of reflecting units in the row 14 having opposed orientation to an adjacent pair of reflecting units in the row 13.

The next row of reflecting units, for example row 15, Fig. 1, has pairs of reflecting units with the same relationship as between the orientations of the respective pairs as in the row 13, with the reflecting units having the same orientation as in said first row 13; however, a pair of reflecting units in row 15 having the same orientation as a corresponding pair of reflecting units in the row 13 is offset longitudinally of the row a distance equal to the spacing between the sides or flats of an hexagonal aperture. Also the corresponding surfaces of said corresponding pairs of reflecting units lie in parallel planes. It is also to be noted that the hexagonal apertures in the rows are arranged whereby a pair of opposite sides or flats thereof are perpendicular to the rows. The reflecting units in the next row 16 correspond to the reflecting units in row 14, with the pairs of reflecting units in row 16 offset relative to a corresponding pair in row 14 the same distance and in the same direction as a pair of reflecting units in row 15 is offset from a corresponding pair in row 13. This relationship of the reflecting units is continued in rows across the entire reflecting device, with alternate rows having pairs of reflecting units with corresponding surfaces and lying in parallel planes but offset a distance equal to the spacing between the sides or flats of a horizontal aperture.

With this arrangement of the reflecting units a pair A of reflecting units in row 13 has the same orientation as a pair E of reflecting units in row 14, with a side F of the hexagonal aperture in one of the reflecting units of the pair in row 13 coinciding with a side of an hexagonal aperture of one of the reflecting units of the corresponding pair in row 14, whereby the reflecting units in row 14 are offset from corresponding reflecting units in row 13 a distance equal to one and one-half the spacing between the flats of a horizontal aperture, and the pairs of reflecting units in row 15 are offset in the same manner and direction from the corresponding pairs of units in row 14.

If the reflecting device is turned 30° in a clockwise direction from that shown in Fig. 1, reflecting units having the same orientation appear to be arranged in alternate zigzag rows up and down the reflecting device and the reflecting units in adjacent zigzag rows are of opposed orientation. With this arrangement, each of the reflecting units 4 has a plurality of reflecting surfaces 11 arranged relatively at right angles and in a circuit around its axis, and all of said units are arranged with their axes parallel. The relative orientations of the reflecting devices and the resulting different direction of maximum and minimum range of inclination of the surfaces of said units are such that a beam of light originating in front of and directed toward the front face 5 of the reflecting device is successively reflected by the surfaces of the reflecting units back through the reflector in the general direction of the light source. The effective reflecting surfaces of the units being distributed over the entire reflecting device gives the effect of a full face reflection at any angular range from which the reflector will be visible.

The hexagonal apertures are contiguous and correspond to the female recesses of the pins in the mold whereby each pin and the recess therein form a complete reflecting unit. Therefore, since all adjacent reflecting units do not have the same orientation, all of the angularly arranged surfaces 11 are not in contiguous relation with surfaces of adjacent units, but terminate in surfaces 17 parallel with the axes of the reflecting units, said surfaces 17 being parallel to the sides of the corresponding hexagonal apertures. The surfaces 17 give some reflection beyond the range of maximum inclination of the angular or prismatic surfaces.

A solid transparent reflecting device constructed as described will have the entire area effective from any side of the axis of each and every one of the reflecting units to a point where the minimum range of inclination of some of the reflecting units is reached. There beyond only half of the reflector units will be effective up to the maximum range of inclination of said units; however, these effective reflector units are distributed over the entire face of the reflecting device, and the entire reflecting device will always be visible to an observer up to the maximum range of inclination and in some positions will be visible beyond the maximum range of inclination due to the arrangement of the surfaces 17.

It is believed obvious that I have provided a reflecting device whose range of inclination will be substantially the same in any direction from the axis of the entire reflector and that it will provide optimum reflection. It is obvious that various changes may be made in the details without departing from the spirit of this invention, and it is, therefore, to be understood that this invention is not limited to the specific details shown and described.

What I claim and desire to secure by Letters Patent is:

A reflecting device of the character described comprising, a plate having a front face and a series of prismatic reflecting units arranged in successive parallel rows on the rear thereof and uniformly distributed over the reflecting portion of the rear of the device for substantially uniform full face reflection when light from a source in front of the reflecting device is directed toward said front face from any angle within limits of any reflection, each unit having a series of square reflecting surfaces with each surface of a unit arranged relatively at right angles to adjacent surfaces of said unit and in a circuit around a central axis extending through the apex of the respective prismatic reflecting unit, all of said units being arranged with said central axes thereof parallel, said units being arranged with the surfaces for the several units intersecting so as to form merging hexagonal apertures for passage of light from a source in front of the reflecting device and directed toward the front face so said light will be successively reflected by the surfaces of the respective unit about its axis and back generally toward said light source, the lines of intersection of the adjacent surfaces of each reflecting unit extending from the apex of the prismatic reflecting unit and bisecting an angle between adjacent sides of the reflective hexagonal aperture, said reflecting units in each row being arranged in pairs with corresponding surfaces of alternate pairs lying in parallel planes and facing in the same direction whereby said units of the last-mentioned pairs have the same orientation, the adjacent pairs of units in the respective row having surfaces facing in opposite directions whereby said units of said adjacent pairs have opposed orientation, said pairs of reflecting units each having one set of surfaces parallel to the row, the pairs of reflecting units in one row being offset longitudinally of the row from pairs of reflecting units having corresponding surfaces in a next adjacent row with only one surface of the corresponding pairs of units in adjacent rows intersecting.

References Cited in the file of this patent

UNITED STATES PATENTS

| | | |
|---|---|---|
| 835,648 | Straubel | Nov. 13, 1906 |
| 1,591,572 | Stimson | July 6, 1926 |
| 1,805,224 | Oestnaes | May 12, 1931 |
| 1,807,350 | Stimson | May 26, 1931 |
| 1,822,451 | Oestnaes | Sept. 8, 1931 |
| 1,848,675 | Stimson | Mar. 8, 1932 |
| 1,906,655 | Stimson | May 2, 1933 |
| 1,950,560 | Martinek | Mar. 13, 1934 |
| 1,955,105 | Stimson | Apr. 17, 1934 |
| 2,029,375 | James | Feb. 4, 1936 |
| 2,107,833 | Paul | Feb. 8, 1938 |
| 2,119,992 | Johnson | June 7, 1938 |
| 2,481,757 | Jungersen | Sept. 13, 1949 |
| 2,538,638 | Wilson | Jan. 16, 1951 |
| 2,685,231 | Onksen | Aug. 3, 1954 |